United States Patent [19]

Commette et al.

[11] 4,416,305
[45] Nov. 22, 1983

[54] VALVED COUPLING FOR CONDUITS

[75] Inventors: Denis S. Commette, Mantoloking; Carl W. Sundberg, Jr., Shrewsbury, both of N.J.

[73] Assignee: Gusmer Corporation, Lakewood, N.J.

[21] Appl. No.: 333,267

[22] Filed: Dec. 22, 1981

[51] Int. Cl.³ .............................................. F16L 37/28
[52] U.S. Cl. .................................. 137/614; 251/152; 285/363; 137/556
[58] Field of Search .................. 137/613, 614, 614.01, 137/556, 556.3; 285/363, 368; 251/149.2, 142, 152, 367, 148, 151

[56] References Cited

U.S. PATENT DOCUMENTS

| 1,634,813 | 7/1927 | Whitehead | 137/614 |
|---|---|---|---|
| 2,376,803 | 5/1945 | Mower et al. | 137/614.06 |
| 2,994,341 | 8/1961 | Lepold, Jr. et al. | 251/288 |
| 3,078,068 | 2/1963 | Romney | 251/149.2 |
| 3,202,946 | 8/1965 | Newman | 285/363 |
| 3,528,447 | 9/1970 | Kolb | 137/614 |
| 3,722,856 | 3/1973 | Koch et al. | 251/152 |
| 3,889,923 | 6/1975 | Saville et al. | 251/334 |
| 3,902,694 | 9/1975 | Friedell | 251/58 |
| 4,004,611 | 1/1977 | Friedell | 137/614 |
| 4,276,905 | 7/1981 | Lourdeaux | 137/613 |

FOREIGN PATENT DOCUMENTS

| 1054792 | 1/1957 | Fed. Rep. of Germany . | |
|---|---|---|---|
| 2402892 | 8/1974 | Fed. Rep. of Germany | 285/368 |
| 839761 | 6/1960 | United Kingdom | 251/288 |

Primary Examiner—A. Michael Chambers
Attorney, Agent, or Firm—Young & Thompson

[57] ABSTRACT

A coupling for conduits through which passes a liquid that must be kept from spilling and/or from being exposed to the air, comprises a pair of parallelepipedal blocks in each of which is disposed a ball valve. Two flat faces of the blocks mate, whereupon the blocks are releasably secured together by bolts. The ball valves are disposed as close as possible to the mating interface of the blocks; and the liquid passageway that opens through the mating faces is surrounded by an annular bevel. Each ball valve has an operator whose rotation through 90° between open and closed valve positions is predetermined by a pin on the operator that engages one or the other face of a recess milled in the block. A pin disposed in a hole in the block is disposed in an annular groove in the valve operator to retain the operator in the block.

5 Claims, 5 Drawing Figures

VALVED COUPLING FOR CONDUITS

The present invention relates to valved couplings for conduits, more particularly of the type in which valves are provided in each of the two halves of a coupling which detachably interconnects the ends of conduit sections to provide a continuous or through conduit.

The invention is of particular use in those environments in which the spillage of the liquid in the conduit, and/or its exposure to air, must be reduced to a minimum. For example, in the production of polyurethane resin, the isocyanate component has a tendency to thicken upon exposure to the air. If conventional couplings were used, then a residue of isocyanate would be left in the coupling upon detaching the coupling halves from each other; and upon exposure to the air, this would thicken and prevent proper subsequent operation of the coupling.

It has therefore been necessary, in the past, to make sure that the halves of the couplings used with such liquids are cleaned immediately after uncoupling, so that no substantial quantity of such liquid will be left in the coupling. Nevertheless, difficulty has been encountered in that, upon uncoupling, there is inevitably spillage of some of the liquid in the coupling. Moreover, the task of cleaning the couplings is time consuming and therefore expensive.

Accordingly, it is an object of the present invention to provide such a coupling, in which a minimum of exposed liquid will remain upon uncoupling, thereby to reduce to a minimum the spillage of the liquid and its exposure to the atmosphere.

Another object of the present invention is the provision of such a coupling, in which any small quantity of remaining exposed liquid can be quickly and easily cleaned away.

A still further object of the present invention is the provision of such a coupling which will be relatively simple and inexpensive to manufacture, and rugged, reliable and durable in use.

Briefly, the objects of the present invention are achieved, by providing a valved coupling for conduits, according to the invention, comprising a pair of generally similar parallelepipedal blocks each of which is provided with a through passageway, a ball valve being disposed in each through passageway. The blocks having mating flat faces and the ball valves are as close as possible to those faces. The passageway that opens through the mating faces is surrounded by a conical annular bevel, which facilitates cleaning. The valve operators have radially extending pins that contact opposite surfaces of recesses milled in the blocks to define the open and closed positions of the valves. Holes drilled in the blocks receive pins that are disposed in annular grooves in the valve operators, to retain the valve operators in the blocks. The parallelepipedal configuration of the blocks enables all the drilling and milling to be done quickly, easily and accurately.

Other objects, features and advantages of the present invention will become apparent from a consideration of the following description, taken in connection with the accompanying drawings, in which.

Figure 1:
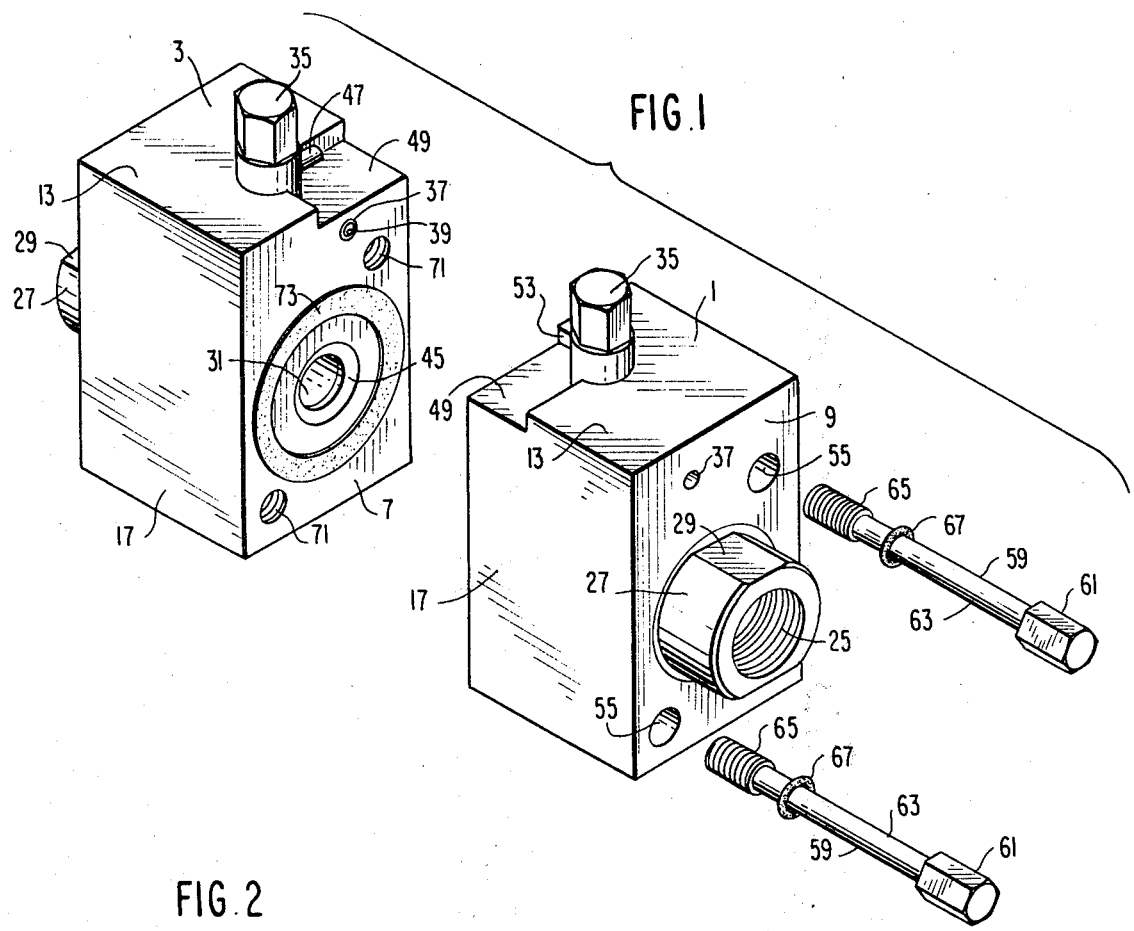
FIG. 1 is an exploded perspective assembly view of a valve coupling for conduits according to the present invention.
Figure 2:
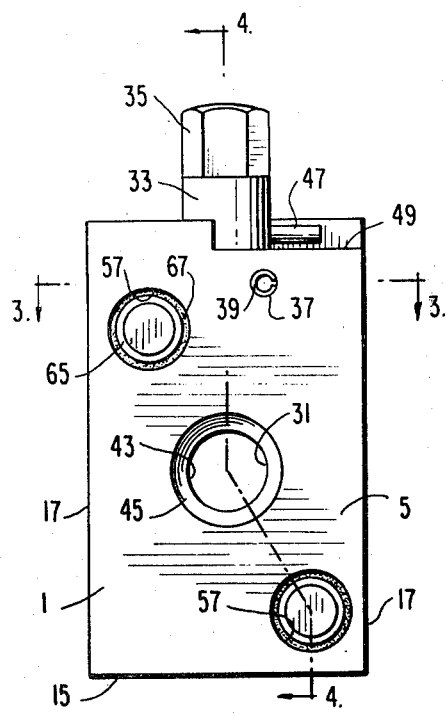
FIG. 2 is a view in the direction of the mating face of the lower right-hand block shown in FIG. 1.
Figure 3:
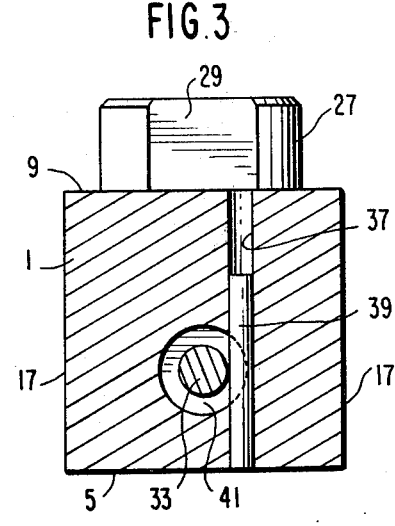
FIG. 3 is a cross-sectional view taken on the line 3—3 of FIG. 2.

Referring now to the drawings in greater detail, and first to FIG. 1 thereof, there is shown a valved coupling for conduits according to the present invention, comprising a pair of generally parallelepipedal blocks 1 and 3 having mating flat faces 5 and 7, respectively, and opposite faces 9 and 11, respectively, which are flat and parallel to faces 5 and 7. Blocks 1 have top faces 13 which are identical and so need no separate reference numerals, bottom faces 15 and side faces 17. The term "parallel-epipedal" of course means that the faces 5–17 are flat and either perpendicular or parallel to each other. Indeed, blocks 1 and 3 can be milled from identical short lengths of bar stock.

Each block has a bore 19 therein, partially internally screw threaded at 21, in which is permanently disposed a plug 23 in screw threaded engagement with screw threads 21, which can be secured in the block 1 or 3 for example by cementing. Each plug 23 is partially internally screw threaded at 25 and extends outwardly from its bore 19 in a head 27 for the reception of a conventional externally screw threaded coupling of a flexible conduit (not shown). Diametrically opposed flats 29 are provided on each head 27, for purchase by a tool for the insertion, and if necessary the removal, of plug 23.

The inner end of each plug 23 is spherically recessed; and the bottom of each bore 19 is spherically recessed on the same radius, to provide a conventional spherical seat for a spherical ball valve 31 having a through passageway. A valve operator 33 rotates in block 1 or 3 and is detachably interconnected with its associated ball valve 31 as by a conventional tongue and groove joint (not shown) such that upon rotation of operator 33, ball valve 31 will turn in the usual way between open and closed positions, that is, between positions in which the bore of valve 31 is and is not aligned with the bore of plug 23. Operator 33 extends up through upper face 13 of each block 1 and 3 and terminates in an exposed hex head 35 whose flat surfaces provide purchase for operating the valve 31.

Figure 4:
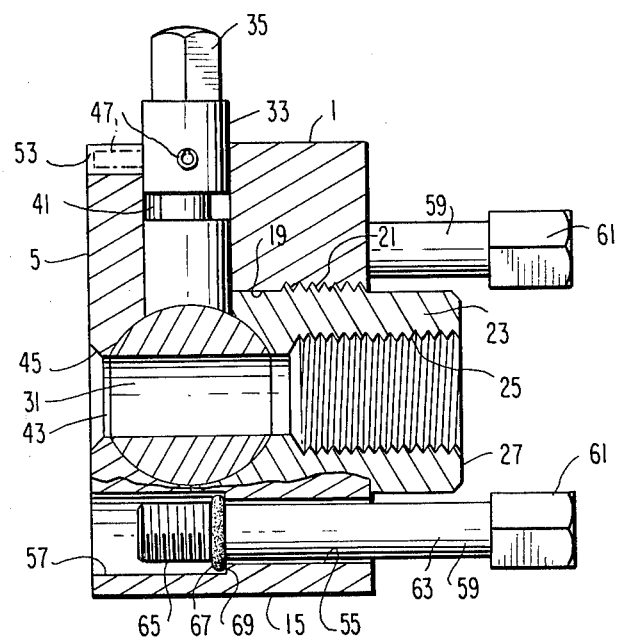
FIG. 4 is a cross-sectional view taken on the line 4—4 of FIG. 2.

A hole 37 is drilled through each of blocks 1 and 3, perpendicular to the mating faces 5 and 7 thereof; and a pin 39 is force fitted in hole 37. To retain pin 39 in hole 37, it may be of spring steel of C-shaped cross section. An annular groove 41 is milled in each valve operator 33, to receive pin 39, thereby to prevent operator 33 from being withdrawn from its bore in block 1 or 3, that is, to prevent 33 from rising as seen in FIG. 4. The fact that hole 37 is a through hole permits pin 39 to be removed for repairing or replacing the parts.

The two ball valves 31 communicate with each other through bores 43 that extend through the mating faces 5 and 7. Each bore 43 is surrounded by an annular conical bevel 45 which, with the protruding portion of ball valve 31 in the closed position, ensures that there will be only a very small recess in which any residual liquid can remain upon uncoupling. Also, it is to be noted that the surfaces presented by the valve 31 in its closed position and the bevel 45, are inclined to each other at rather large angles, so that it is easy to clean the resulting recess with one swipe of a rag.

Figure 5:
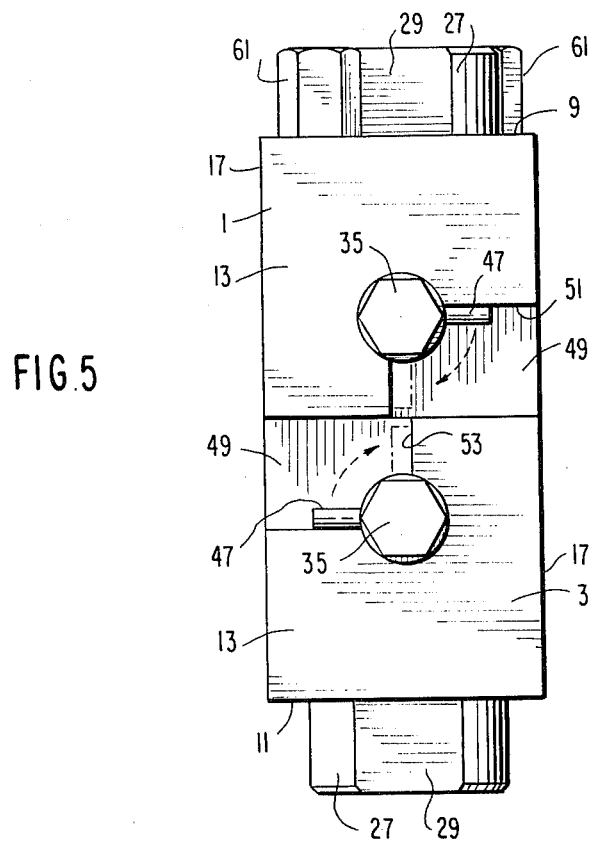
FIG. 5 is a top plan view of the assembled coupling.

Projecting radially from the upper end of each operator 33 is a pin 47 that swings in a recess 49 milled in the upper end of each block 1 and 3. Specifically, each recess 49 has a flat bottom parallel to and spaced below the corresponding top face 13, and two vertical sides 51 and 53 that are perpendicular to each other. As best seen in FIG. 5, sides 51 and 53 of recess 49 are perpendicular and parallel to the sides of the blocks but are not quite radially disposed relative to operators 33. Instead, the surfaces 51 and 53 are so positioned that upon rotation of operators 33, the pins 47 can swing 90° between the full and phantom line positions shown in FIG. 5. One of these positions will of course be the open valve position and the other will be the closed valve position. One way of indicating which is which, is to position the pin 47 parallel to the bore of valve 31. With this arrangement, the valves are closed in the full line positions of the pins 47 as seen in FIG. 5, and open in the phantom line positions thereof. Alternatively, of course, the valves can be marked with "off" and "on" or "open" and "closed" legends or other indicia, to indicate the condition of the valves.

The provision of a recess such as 49 in combination with pin 47, is a particularly simple way of determining the "off" and "on" positions of the valves, because the recesses 49 can be formed by a simple one-step milling operation.

Block 1 is provided with a pair of bores 55 that open through opposite face 9 thereof and that are coaxial and communicate with a pair of larger counterbores 57 that open through mating face 5 thereof. Bolts 59 are loosely received in bores 55 and counterbores 57 and have enlarged hex heads 61 on the ends thereof that protrude from opposite face 9. Bolts 59 have shanks 63 of reduced diameter that terminate inwardly, that is, in the direction of block 3, in screw threads 65 whose diameter is greater than the diameter of shanks 63. Small elastically deformable O-rings 67 are stretched over screw threads 65 and slide on shanks 63. From the position of the parts shown in FIG. 4, it will be seen that O-rings 67 abut shoulders 69 between bores 55 and 57, thereby to prevent withdrawal of bolts 59 from block 1 in a direction to the right of FIG. 4. Heads 61 of course prevent removal of the bolts in the other direction. Needless to say, screw threads 65 have an outer diameter less than the inner diameter of bores 55, to permit assembly of the bolts in block 1, after which O-rings 67 are rolled over screw threads 65 to complete the assembly.

Hex heads 35 and 61 are preferably of the same size, to permit manipulation of all four hex heads by a single socket wrench.

Block 3 is provided with internally screw-threaded blind bores 71 that open through mating face 7 thereof. In the assembled position of the parts, bores 71 are coaxial with counterbores 57 and receive screw threads 65 to secure the two blocks tightly together in the assembled position of FIG. 5. In that assembled position, mating faces 5 and 7 are sealed to each other about bores 43, by an annular elastic deformable sealing ring 73 that is recessed in one of faces 5 and 7 and which protrudes from the face in which it is recessed thereby to seal against the other mating face when bolts 59 are tightened into bores 71.

It is particularly to be noted, with regard to the various bores and milled surfaces, that these are all perpendicular or parallel to the flat faces of the parallelepipedal blocks. This greatly facilitates and hastens, and hence renders much less expensive, the setting up and boring or milling or beveling operations performed on the blocks.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. For example, the recess 49, instead of being generally rectangular, can be cylindrical about a vertical axis. These and other modifications and variations are considered to be within the purview and scope of the present invention as defined by the appended claims.

What is claimed is:

1. A coupling for conduits comprising a pair of blocks having opposed flat faces, means for detachably securing the blocks together with their opposed flat faces in sealed relationship with each other, a passageway through each block perpendicular to the opposed flat faces for the passage of liquid, a ball valve disposed in each passageway for opening and closing the passageway, each ball valve having a spherical outer surface which, in the closed position of the valves, is disposed in said passageway closely adjacent the plane of the associated said flat face, said spherical surface of each said ball valve lying entirely on one side of the associated said plane, and an annular beveled surface coaxial with each said passageway and opening through the associated said opposed flat face, each said annular beveled surface being conical and lying on a cone whose apex is disposed a substantial distance from the centroid of the spherical outer surface of the associated said ball valve on the same side of said centroid as said beveled surface, each said annular beveled surface terminating in circular edges disposed in two spaced parallel planes, a portion of said spherical outer surface of said ball valve being disposed between said spaced parallel planes in the closed position of th valves.

2. A coupling as claimed in claim 1, in which said blocks are parallelepipedal.

3. A coupling as claimed in claim 2, and an operator for each said ball valve, each operator comprising a rotatable valve stem having an annular groove therein, a bore in the block that communicates with said groove, and a pin disposed in said bore and said groove to retain said operator in said block.

4. A coupling as claimed in claim 3, said bores being parallel and perpendicular to the faces of the blocks.

5. A coupling as claimed in claim 1, each said ball valve having an operator comprising a rotatable valve stem that protrudes through one face of the associated block, a pin extending radially from the valve stem, a recess milled in that face of the block through which the valve operator protrudes, the recess having two surfaces contacted by the pin to predetermine two rotated positions of the valve stem, one of said pin positions determining the open position of the associated ball valve and the other said pin position determining the closed position of the associated said ball valve.

* * * * *